(12) United States Patent
Smith et al.

(10) Patent No.: US 7,533,900 B2
(45) Date of Patent: May 19, 2009

(54) HYBRID INFLATOR WITH EXTENDED FILLING CAPABILITY

(75) Inventors: Bradley W. Smith, Plain City, UT (US); David J. Green, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 137 days.

(21) Appl. No.: 11/519,624

(22) Filed: Sep. 11, 2006

(65) Prior Publication Data
US 2008/0061540 A1    Mar. 13, 2008

(51) Int. Cl.
*B60R 21/26* (2006.01)
(52) U.S. Cl. ........................ 280/736; 280/741
(58) Field of Classification Search .............. 280/730.2, 280/736, 740–742, 743.1
See application file for complete search history.

(56) References Cited

U.S. PATENT DOCUMENTS

| | | | | |
|---|---|---|---|---|
| 3,117,424 | A * | 1/1964 | Hebenstreit ..................... 222/3 |
| 3,721,456 | A * | 3/1973 | McDonald .................. 280/736 |
| 3,836,170 | A * | 9/1974 | Grosch et al. ............... 280/737 |
| 3,944,769 | A * | 3/1976 | Wagner .................... 200/83 A |
| 3,966,226 | A * | 6/1976 | Roth ......................... 280/737 |
| 5,022,674 | A | 6/1991 | Frantom et al. |
| 5,078,422 | A * | 1/1992 | Hamilton et al. ............. 280/736 |
| 5,582,428 | A | 12/1996 | Buchanan et al. |
| 5,584,505 | A * | 12/1996 | O'Loughlin et al. ........ 280/737 |
| 5,601,308 | A * | 2/1997 | Cuevas ....................... 280/736 |
| 5,630,618 | A * | 5/1997 | Hamilton et al. ............. 280/736 |
| 5,664,803 | A | 9/1997 | Skanberg et al. |
| 5,675,102 | A | 10/1997 | Hamilton et al. |
| 5,711,546 | A | 1/1998 | Hamilton et al. |
| 6,170,868 | B1 * | 1/2001 | Butt et al. ................... 280/737 |
| 6,543,806 | B1 | 4/2003 | Fink |
| 2002/0053789 | A1 * | 5/2002 | Fujimoto et al. ............. 280/741 |
| 2005/0062272 | A1 | 3/2005 | Smith et al. |
| 2007/0102912 | A1 * | 5/2007 | Bowers ....................... 280/740 |

FOREIGN PATENT DOCUMENTS

WO    WO 9218356 A1 * 10/1992

* cited by examiner

*Primary Examiner*—Faye M. Fleming
*Assistant Examiner*—Laura Freedman
(74) *Attorney, Agent, or Firm*—Sally J. Brown; Madson IP

(57) ABSTRACT

A "hybrid" inflator having an extended filling capacity is disclosed. This inflator is designed to deploy an inflatable curtain airbag. The inflator will have an inner chamber that is connected to an outer chamber by a bleed hole. The inner chamber has a first supply of gas and a pyrotechnic material. This first supply of gas is sufficient to inflate an inflatable curtain after ignition of the pyrotechnic material. The outer chamber has a second supply of gas. The second supply of gas bleeds out of the outer chamber through the inner chamber and into the inflatable curtain. The inflatable curtain may be initially filled by the first supply of gas in the inner chamber while the second supply of gas slowly bleeds out of the inflator into the curtain to maintain the curtain at a desired pressure sufficient to provide impact protection to the vehicle occupant.

15 Claims, 4 Drawing Sheets

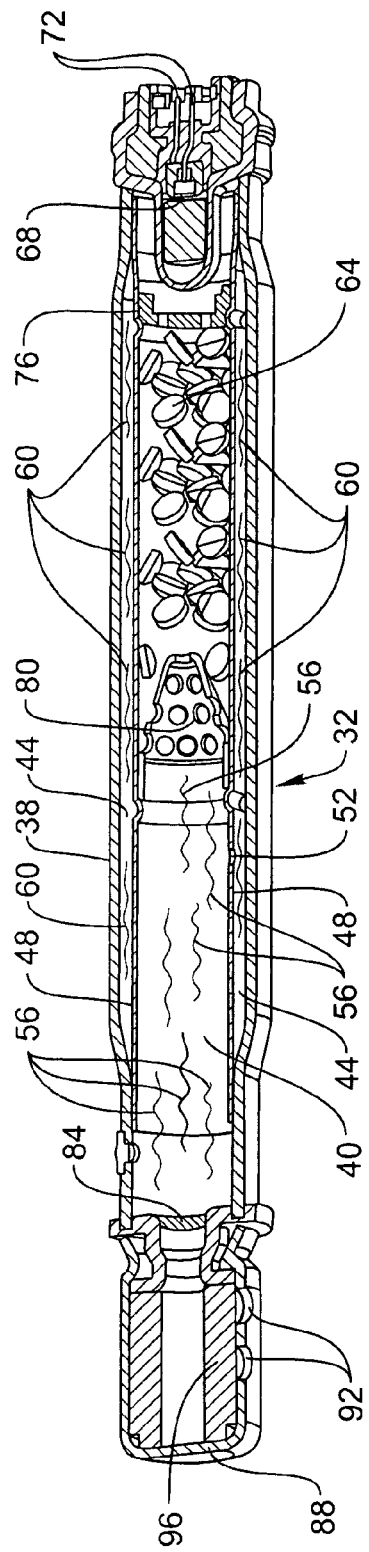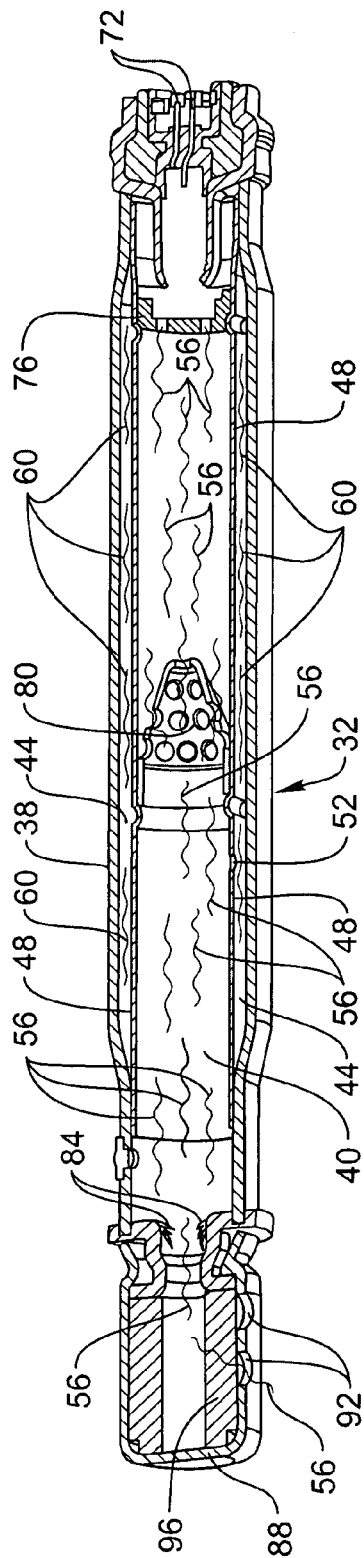
FIG. 3
FIG. 4

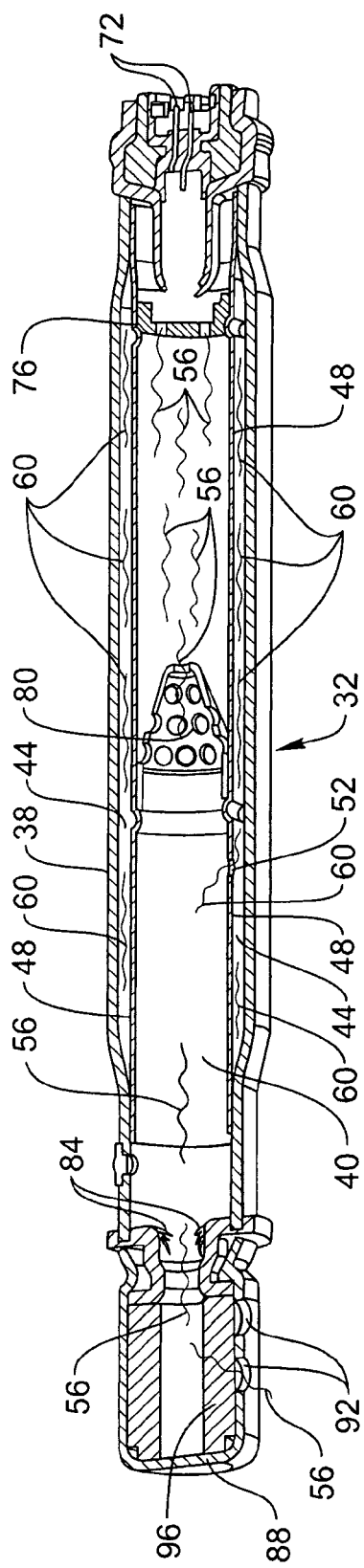
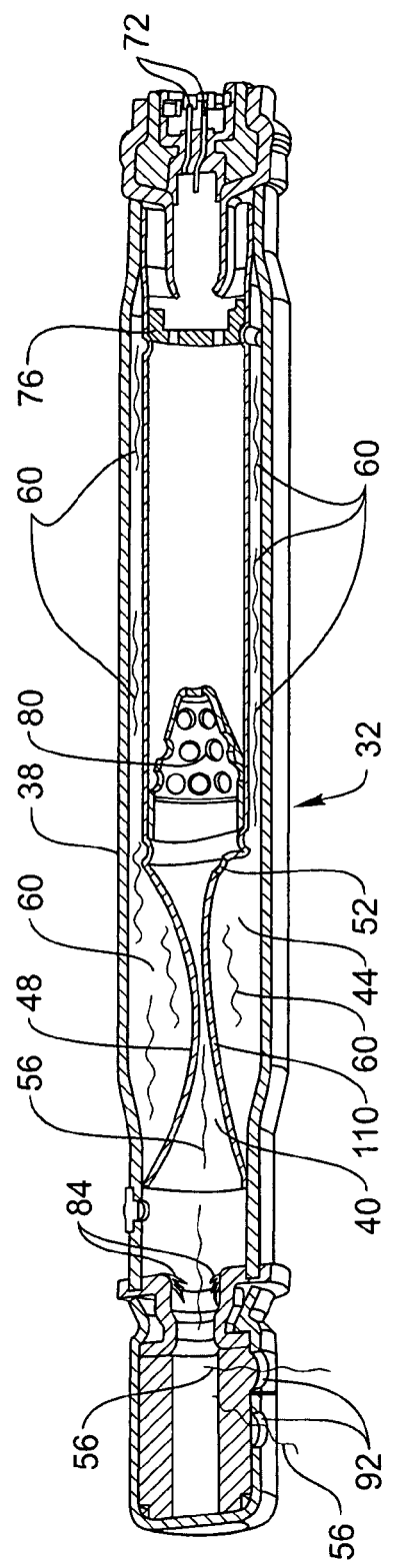

HYBRID INFLATOR WITH EXTENDED FILLING CAPABILITY

BACKGROUND OF THE INVENTION

Inflatable safety restraint devices, or "airbag restraints," are mandatory on most new vehicles. Airbag restraints commonly contain a collision sensor, an inflator, and an inflatable airbag. In the event of an accident, the collision sensor within the vehicle, such as an accelerometer, measures abnormal deceleration and triggers the inflator. The inflator is connected to the one or more airbags positioned within the vehicle. Upon receipt of the signal from the collision sensor, the inflator rapidly produces a quantity of inflation fluid or gas which fills the airbag and protects the passenger from harmful impact with the interior of the vehicle and may inhibit the passenger from being ejected from the vehicle.

One type of airbag that has received recent attention is an inflatable curtain airbag. Inflatable curtain airbags have also been developed in response to the need for passenger protection from lateral impacts with the side of a vehicle's interior. This situation might occur when another vehicle collides with the side of the car, or when the car loses control and rolls over causing the side of the car to repeatedly impact the ground.

Inflatable curtain airbags designed only to protect the occupant during lateral impacts need only remain inflated for 50 to 100 milliseconds. Inflatable curtain airbags which are also designed to provide protection during rollover-type impacts must remain inflated much longer, generally from 3 to 7 seconds.

Such airbags are designed to prevent the head of a vehicle occupant from emerging through the window opening or from colliding with a collision surface at the side of the vehicle. The shape of the curtain airbag generally conforms to the shape of the window area or side of the car adjacent the passenger's torso. Side inflatable curtains are typically positioned above the window of the vehicle. In general, these airbags are attached to the vehicle's "roof rail" and are positioned behind the vehicle's headliner.

Generally, inflatable curtain airbags designed only for lateral impacts may utilize "hot gas" inflators since cooling of the gas and loss of airbag pressure is not an issue due to the short duration of the event. However, inflatable curtain airbags designed additionally for rollover impacts have historically used "cold gas" inflators to meet the extended pressure requirements.

These inflators have a quantity of stored gas that will be channeled into the inflatable curtain during an accident. Such inflators are generally referred to as cold gas inflators because there is generally no heating of the gas as the gas is channeled into the airbag. In fact, if there is any "heating" of the gas in a cold gas inflator, such heating is insignificant and is much less than the amount of cooling that occurs when the gas expands out of the inflator.

Once the gas from a "cold gas" inflator has entered the airbag, this gas will continue to warm up (due to ambient heat) and will thus maintain a relatively high pressure within the inflatable curtain for long periods of time. As such, the inflated inflatable curtain will thus be capable of protecting the occupant throughout the duration of the rollover/crash.

Unfortunately however, such cold gas inflators are generally heavy and very large. Accordingly, these cold gas inflators can be difficult to install and costly to manufacture.

In contrast to cold gas inflators, "hot gas" inflators are those inflators that will heat the gas during deployment of the airbag. Hot gas inflators include pyrotechnic inflators which operate to produce the quantity of inflator gas via ignition of a pyrotechnic material (such as sodium azide). Another type of a hot gas inflator is the so-called "hybrid" inflator which includes both a pyrotechnic material and a quantity of a stored gas. In general, the heat that is used to warm the gas is generated, at least in part, from the ignition of the pyrotechnic material.

The heating of the gas during deployment means that a hot gas inflator uses fewer moles (molecules) of gas to provide the same volume of gas. As explained by the fundamental chemical equation $PV=nRT$, as the temperature of the gas increases, the volume of the gas will likewise expand. Accordingly, because the hot gas inflator provides heat to the gas, fewer moles of the gas (or gas producing material) are needed in order to fill the volume of inflatable curtain. Thus, a hot gas inflator can be smaller and lighter, and yet still provide the requisite volume of gas needed to inflate the inflatable curtain during deployment.

These smaller, lighter hot gas inflators are (1) easier to install on the vehicle and (2) cheaper to manufacture; accordingly, airbag manufacturers often, given a choice, choose to use hot gas inflators rather than cold gas inflators. Unfortunately however, hot gas inflators do have their own limitations. Specifically, after the hot gas has been channeled into the airbag, this hot gas will begin to cool back down to ambient temperature. Such cooling of the gas reduces the pressure of the airbag. Thus, the hot gas inflator does not produce an airbag that maintains a high pressure for extended periods of time. Rather, over time (as the gas cools), the airbag will begin to deflate as the gas diminishes in pressure.

Rollovers and/or other significant crashes can often last long periods of time (i.e., several seconds). Accordingly, most manufacturers want the inflated inflatable curtain to maintain a high pressure several seconds in order to properly protect the occupant during the rollover. Because exising hot gas inflators cannot maintain these high airbag pressures for long periods of time, many manufacturers have chosen not to use hot gas inflators in their inflatable curtain systems; rather, the manufacturers choose to use the larger, cold gas inflator to ensure that the pressure in the inflatable curtain remains at an optimal level for the desired period of time.

One additional problem associated with hot gas inflators is that of "heat soak out." Specifically, because the ignition of the pyrotechnic material in the hot gas inflator produces such quantities of heat, there is generally large amounts of heat that are stored within the inflator even after the gas has been deployed into the airbag. (This heat is generally held in the filter/diffuser of the inflator). Again over time, this heat will slowly diffuse out of the inflator into the area surrounding the inflator. As these surrounding areas are often made of plastic or fabric, this "heat soak out" melts and/or destroys these plastic/fabric parts.

Accordingly, it would be an advancement in the art to provide a new type of hot gas inflator that may be used on a inflatable curtain airbag system, but will still provide extended pressure within the inflated cushion for extended periods of time. Additionally, it would be an advancement in the art to provide a new type of hot gas inflator that contains minimal residual heat and thus eliminates "heat soak out" issues with surrounding parts. Such a device is disclosed herein.

BRIEF SUMMARY OF THE INVENTION

The present embodiments generally relate to an inflator that may be used in conjunction with an inflatable curtain. The inflator will generally have a peripheral (outer) wall and will have two chambers, namely an inner chamber and an outer chamber. These chambers are positioned on the interior of the peripheral wall. The outer chamber and the inner chamber are generally concentric. This means that at least a portion of the outer chamber will be positioned closer to the peripheral wall. A bleed hole is positioned in the internal wall to allow communication between the outer chamber and the inner chamber. More than one bleed hole may also be used.

The inner chamber comprises a first supply of gas whereas the outer chamber comprises a second supply of gas. The same type of gas may be used for the first supply of gas and the second supply of gas. The addition of the bleed hole to the internal wall means that the first supply of gas and the second supply of gas may freely mix/intermingle with each other by passing through the bleed hole. Accordingly, when the inflator is in the undeployed configuration, there is no pressure differential between the outer chamber and the inner chamber.

A pyrotechnic material and an initiator are also added to the inflator. The pyrotechnic material is positioned in the inner chamber. The initiator is designed to ignite/combust the pyrotechnic material upon receipt of the appropriate signal indicating a crash.

The inner chamber is sealed by a burst disk that holds the first supply of gas within the inner chamber. The burst disk is designed to rupture during deployment of the inflator. This rupturing of the burst disk unseals the inflator and allows the first supply of gas and the second supply of gas to flow out of the inflator into the inflatable curtain.

A diffuser may also be added to the inflator. The diffuser is positioned on the end of the inflator proximate the burst disk. The diffuser includes one or more exit ports that allow gas to escape the inflator. A filter may also be added that operates to filter the supplies of gas when these gas molecules flow out of the inflator.

During deployment of the inflator, the initiator will ignite/combust the pyrotechnic material to produce a gaseous material that combines with the first supply of gas. The creation of this additional quantity of gas from the pyrotechnic material increases the pressure within the inner chamber and ruptures the burst disk. Accordingly, the first supply of gas quickly flows out of the inflator and enters the inflatable curtain.

The first supply of gas is sufficient to inflate an inflatable curtain after ignition of the pyrotechnic material. More specifically, once the pyrotechnic material creates the additional quantity of gas, there is a sufficient amount of gas in the first supply of gas such that when this quantity of the first supply of gas is channeled into the inflatable curtain, the curtain will be fully inflated. The ignition of the pyrotechnic material creates heat that will be absorbed by the first supply of gas. When the first supply of gas passes through the filter prior to entering the inflatable curtain, the filter operates to cool the first supply of gas.

The first supply of gas fully inflates the cushion. However, once the burst disk has ruptured, the second supply of gas will bleed out of the outer chamber so that this gas may likewise be channeled into the inflatable curtain. Specifically, the second supply of gas will pass through the bleed hole and will enter the inner chamber. This supply of gas will then exit the inner chamber by passing through the diffuser, and then pass through the filter and exit the inflator via the ports.

When the second supply of gas flows through the bleed hole into the inner chamber, the residual heat in the inner chamber (that was produced during combustion/ignition of the pyrotechnic material) will warm/heat the second supply of gas. This heating of the second supply of gas causes the gas to expand and increases the ability of the second supply of gas to fill the inflatable curtain and maintain (for extended periods of time) the inflatable curtain at a pressure capable of protecting the occupant. Further, when the second supply of gas flows out of the diffuser, this gas flows through the filter. As noted above, the filter absorbs some of the heat from the hot gas produced in conjunction with the ignition of the pyrotechnic material. In some embodiments, this residual heat in the filter may be imparted to the second supply of gas as it passes through the filter.

In some embodiments, the first supply of gas is vented out of the inner chamber faster than the second supply of gas can bleed out of the outer chamber. Accordingly, all or a portion of the second supply of gas remains in the outer chamber at the time that the inner chamber is emptying The presence, of the second supply of gas exerts pressure upon the inner chamber. Embodiments, of the inflator may be designed such that once the pressure exerted by the outer chamber onto the inner chamber exceeds a certain threshold level, the outer chamber will expand in volume whereas the inner chamber will decrease in volume. In some embodiments, such changes in volume is caused by the inner chamber buckling or collapsing inward.

This type of inward buckling of the inner chamber may, in some embodiments, be beneficial in that it increases the volume of the outer chamber. Of course, when the volume of the outer chamber increases, the pressure of the second supply of gas within the outer chamber will significantly decrease. Such a reduction in the pressure of the second supply of gas allows the second supply of gas to bleed out of the outer chamber (via the bleed hole) at a more controlled, constant or steady rate and over a longer time period. Accordingly, the ability of the second supply of gas to bleed out into the curtain and maintain the curtain at a desired pressure is greatly increased. In fact, by allowing the inner chamber to buckle, the second supply of gas can bleed out over a period of seconds and maintain the curtain at the desired pressure for 5 to 10 seconds.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a cross-sectional view of an embodiment of an inflator that may be used in the inflatable curtain assembly in which the inflator is shown prior to deployment;

FIG. 4 is a cross-sectional view of the inflator of FIG. 3 in which the pyrotechnic material has been ignited to deploy the inflatable curtain;

FIG. 5 is a cross-sectional view of the inflator of FIG. 3 in which gas from the outer chamber is being deployed;

FIG. 6 is a cross-sectional view of an inflator in which the inner chamber buckles as part of the deployment process.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Figure 1:
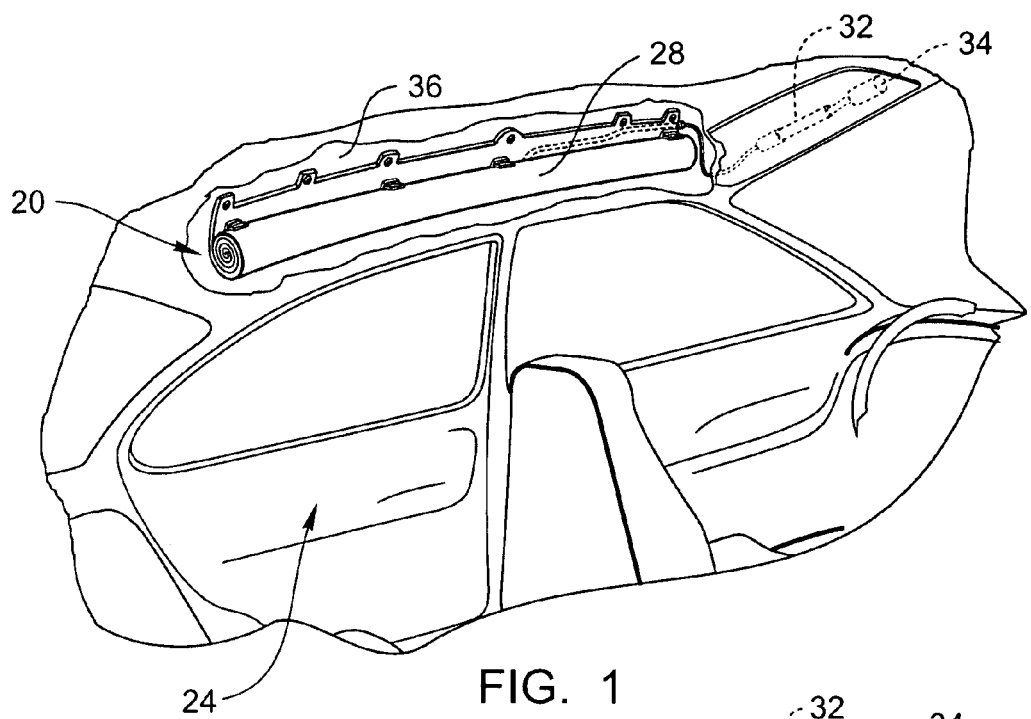
FIG. 1 is a perspective view of the side interior of a vehicle and revealing in cutaway an inflatable curtain assembly that includes an inflator according to the present invention.
Figure 2:
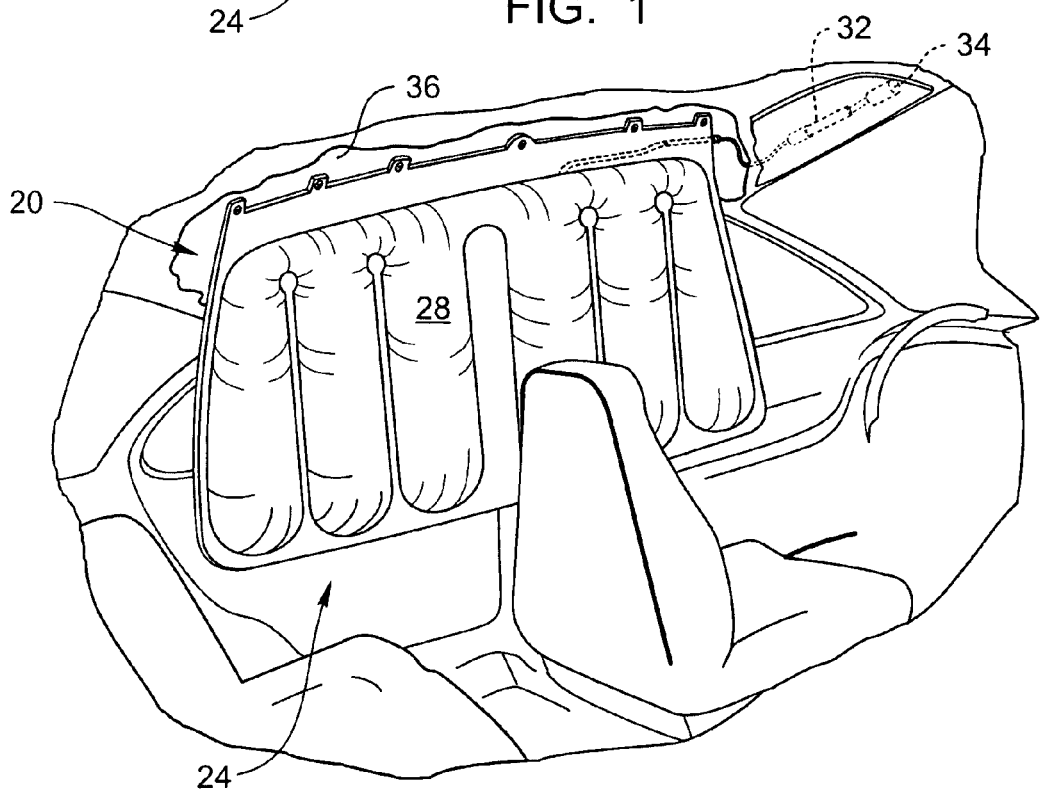
FIG. 2 is a perspective view of the inflatable curtain assembly of FIG. 1 in which the inflatable curtain is shown in the deployed configuration.

Referring now to FIGS. 1 and 2, a perspective view illustrates an inflatable curtain assembly 20 that is installed on a vehicle interior 24. The inflatable curtain assembly 20 includes an airbag 28 and an inflator 32. As shown in FIGS. 1 and 2, the airbag 28 is an inflatable curtain 28. The inflatable curtain 28 is attached and positioned along the vehicle's roof rail 36. The inflatable curtain 28 has a deployed configuration and a stowed or undeployed configuration. As shown in FIG. 1, the inflatable curtain 28 is in the undeployed configuration. In FIG. 2, the inflatable curtain 28 is shown in the deployed configuration.

Like other inflatable curtain systems, the assembly 20 is designed such that during a crash or accident, the inflator 32 will channel a supply of inflation gas into the inflatable curtain 28 and will cause the curtain 28 to deploy from the stowed configuration into the deployed configuration. A control unit 34 will indicate that the vehicle is experiencing an accident and that the curtain 28 needs to be deployed. In general, this deployed configuration will cover the window and lateral side of the vehicle interior 24 and will inhibit or prevent a vehicle occupant from emerging through the window opening or from colliding with a collision surface at the side of the vehicle. The particular construction of the inflatable curtain 28, as well as the use and installation of the curtain 28 onto the vehicle interior 24, are well known to those skilled in the art. In general, the inflatable curtain 28 must be deployed into the deployed configuration within about 20 milliseconds and must have a pressure of greater than about 50 to 80 kilopascals within about 30 milliseconds.

Referring now to FIG. 3, a cross-sectional view shows an embodiment of the inflator 32 that may be used in the inflatable curtain assembly 20 of FIG. 1. As shown in FIG. 3, the inflator 32 is shown in the undeployed configuration.

As known in the art, the inflator 32 is made of metal and is designed such that it will channel a quantity of inflation gas into the curtain 28 (shown in FIG. 1) during a crash sufficient to cause the curtain 28 to deploy and protect the vehicle occupant. As shown, the inflator 32 has a generally cylindrical shape. However, other shapes and/or configurations for the inflator 32 are also possible.

The inflator 32 will generally have a peripheral wall 38 and will have two chambers, namely an inner chamber 40 and an outer chamber 44, positioned adjacent the interior of the peripheral wall 38. As shown in FIG. 3, the chambers 40, 44 extend nearly the entire longitudinal length of the inflator 32. The chambers 40, 44 are separated by an internal wall 48. However, at least one bleed hole 52 is positioned in the internal wall 48 to allow communication between the outer chamber 44 and the inner chamber 40.

The outer chamber 44 and the inner chamber 40 are generally concentric. This means that at least a portion of the outer chamber 44 will be positioned closer to the peripheral wall 38 than the inner chamber 40. In the embodiment shown in FIG. 3, the outer chamber 44 occupies the entire area between the internal wall 48 and the peripheral wall 38. In further embodiments, the outer chamber 44 will completely surround the inner chamber 40. In the embodiment shown in FIG. 3, the entirety of the inner chamber 40 is positioned inside of the outer chamber 44. However, other embodiments may be constructed in which all or a portion of the inner chamber is located outside (exterior) of all or a portion of the outer chamber 40.

The inner chamber 40 comprises a first supply of gas 56 whereas the outer chamber 44 comprises a second supply of gas 60. The same type of gas may be used for the first supply of gas 56 and the second supply of gas 60. However, other embodiments may use different types of gas for the first supply 56 and the second supply 60. The particular type of gas(es) that may be used for the first and second supplies of gas 56, 60 are known to those of skill in the art.

The addition of the bleed hole 52 to the internal wall means that the first supply of gas 56 and the second supply of gas 60 may freely mix/intermingle with each other by passing through the bleed hole 52. Accordingly, when the inflator 32 is in the undeployed configuration of FIG. 3, there is no pressure differential between the outer chamber 44 and the inner chamber 40. Rather, the supplies of gases 56, 60 will generally be maintained at the same pressure within the inflator 32.

The inflator 32 is a "hybrid" inflator which means that, in addition to the supplies of gas 56, 60, the inflator 32 also includes a pyrotechnic material 64. The pyrotechnic material 64 is positioned in the inner chamber 40. For purposes of illustration, the pyrotechnic material 64 is shown as solid pellets, although other configurations and/or shapes of the pyrotechnic material 64 are clearly possible. The pyrotechnic material 64 is a material that, upon ignition, will produce a quantity of gas. (It is for this reason that the pyrotechnic material is sometimes called a "gas generant" material.) Those of skill in the art are familiar with the variety of different types of materials that may be used as the pyrotechnic material 64. One example of this type of material that may be used as the pyrotechnic material 64 is sodium azide.

The inflator 32 also has an initiator 68. The initiator 68 is a device that is capable of igniting the pyrotechnic material 64 upon receipt of the appropriate signal. Initiators are commonly used with hybrid inflators and are thus known in the art. In the particular embodiment shown in FIG. 3, the initiator 68 comprises one or more electrical wires 72 that will, upon receipt of the signal indicating crash conditions, send an electrical charge and/or heat into the pyrotechnic material 64 sufficient to cause the pyrotechnic material 64 to ignite/combust. In order to prevent premature ignition of the pyrotechnic material 64 by the initiator 68, a perforated metal disk (or screen) 76 may separate the initiator 68 from the pyrotechnic material 64. Of course, when the inflator 32 is to be deployed, the perforated metal disk 76 will allow hot gases and particulates from the initiator 68 to properly ignite the pyrotechnic material 64.

A screen 80 may also be added to the inner chamber 40. The screen 80 is positioned proximate the pyrotechnic material 64. Specifically, when the pyrotechnic material 64 is ignited to produce a gaseous material, the screen 80 is used to keep the burning pyrotechnic material 64 in place, while still allowing the gaseous material and heat to interact with the first supply of gas 56. Rather, the only product that passes through the screen 80 is the gaseous product (produced by the ignition of the pyrotechnic material 64) that may be used to inflate the inflatable curtain.

The inner chamber 40 is sealed by a burst disk 84 that holds the first supply of gas 56 within the inner chamber 40. As will be explained herein in greater detail, the burst disk 84 is designed to rupture during deployment of the inflator 32. This rupturing of the burst disk 84 unseals the inflator 32 and allows the first supply of gas 56 and the second supply of gas 60 to flow out of the inflator 32 into the inflatable curtain 28.

A diffuser 88 may also be added to the inflator 32. The diffuser 88 is positioned on the end of the inflator 32 proximate the burst disk 84. The diffuser 88 includes one or more exit ports 92 that allow gas to escape the inflator 32. Accordingly, when the burst disk 84 is ruptured during deployment, the supplies of gas 56, 60 will flow through the diffuser 88 and out of the inflator 32 via the exit ports 92. A filter 96 may also be added that operates to filter the supplies of gas 56, 60 when these gas molecules flow out of the inflator 32.

Referring now to FIG. 4, a cross-sectional view illustrates the deployment of the inflator 32 in greater detail. Specifically, once a signal is received from a sensor or control unit (shown in FIG. 1), the initiator 68 will ignite, sending hot particles and gases through the perforated metal disk 76 which will ignite the pyrotechnic material 64.

The ignition of the pyrotechnic material 64 will produce a gaseous material that passes through the screen 80 and combines with the first supply of gas 56. The creation of this additional quantity of gas and heat from the pyrotechnic material 64 increases the pressure within the inner chamber 40 and ruptures the burst disk 84. Accordingly, the first supply of gas 56 quickly flows out of the inflator 32 (by passing through the filter 96 and then the diffuser 88 via the exit ports 92) and enters the inflatable curtain 28.

It should be noted that the first supply of gas 56 is sufficient to inflate an inflatable curtain after ignition of the pyrotechnic material 64. More specifically, once the pyrotechnic material creates the additional quantity of gas, there is a sufficient amount of gas in the first supply of gas 56 such that when the first supply of gas 56 is channeled into the inflatable curtain 28, the curtain 28 will be fully inflated. Thus, the first supply of gas 56 operates to fully inflate the curtain 28 while all or a portion of the second supply of gas 60 remains in the outer chamber 44. In fact, in some embodiments, the first supply of gas 56 can fully inflate the curtain 28 while all or substantially all of the second supply of gas 60 remains in the outer chamber 44.

As explained in greater detail above, the ignition of the pyrotechnic material 64 creates heat that will be absorbed by the first supply of gas 56. When the first supply of gas 56 passes through the filter 96 prior to entering the inflatable curtain, the filter 96 operates to cool the first supply of gas 56. More specifically, the filter 96 is made of a material that will absorb some of the heat from the first supply of gas 56 prior to this gas entering the inflatable curtain 28. The filter 96 may also absorb some of the heat housed in the interior of the inner chamber 40.

It should be noted that, because the inner chamber 40 comprises both a pyrotechnic material 64 and a supply of gas 56, the inflator 32 is a hybrid-type "hot gas" inflator that may be still be used in conjunction with inflatable curtains. Thus, like other hot gas inflators, the inflator 32 may be smaller and lighter than the typical cold gas inflator. In fact, in some embodiments, the inflator 32 may be about 40% smaller than other types of cold gas inflators that are currently being used in inflatable curtain systems. Further, these embodiments are also lighter than typical cold gas inflators as they can be made to weigh less than 1 kilogram (such as, for example, about 710 grams).

Referring now to FIG. 5, a cross-sectional embodiment further shows the deployment of the inflator 32. Once all or a portion of the of the first supply of gas 56 has exited the inflator 32 (via the ports 92), the second supply of gas 60 will bleed out of the outer chamber 44 so that this gas may likewise be channeled into the inflatable curtain 28. Specifically, the second supply of gas 60 will pass through the bleed hole 52 and will enter the inner chamber 40. This supply of gas 60 will then exit the inner chamber by passing through the diffuser 88, and then pass through the filter 96 and exit the inflator 32 (via the ports 92) so that it may be channeled into the inflatable curtain 28. As shown in FIG. 5, all or a substantial portion of the second supply of gas 60 remains in the outer chamber 44, and thus, the outer chamber 44 will have a high pressure (such as, for example, a pressure greater than about 50 megapascals.). At the same time, the inner chamber 40 has a much lower pressure, as all or a portion of the first supply of gas 56 has already exited the inner chamber 40. In the embodiment shown in FIG. 5, the pressure of the first supply of gas 56 in the inner chamber 40 is less than or equal to about 17 megapascals. Of course, further embodiments may be constructed in which the pressure of the first supply of gas 56 is much lower than about 17 megapascals. Other embodiments may be constructed in which the pressure of the first supply of gas 56 is higher than about 17 megapascals.

As noted above, the first supply of gas 56 is used to fully inflate the cushion 28, whereas the second supply of gas 60 "bleeds out" after all or a portion of the first supply of gas 56 has been used to fully inflate the curtain 28. Accordingly, this second supply of gas 60 will provide extended filling capability to the curtain 28, thereby ensuring that the curtain 28 remains fully inflated throughout the duration of the crash/rollover. In some embodiments, this influx of the second supply of gas 60 occurs, over time, such that the curtain 28 remains at a protection pressure (i.e., such as 40 kilospascals or another pressure that is sufficient to properly protect an occupant from harmful impact during a crash) for at least 3 to 7 seconds after ignition of the pyrotechnic material 64. In other embodiments, the influx of the second supply of gas 60 occurs, over time, such that the curtain 28 remains at a protection pressure for at least 3 to 7 seconds after ignition of the pyrotechnic material 64.

As explained above, the ignition of the pyrotechnic material 64 in the inner chamber 40 produces quantities of heat that is used to heat the first supply of gas 56. However, a portion of this heat energy remains in the inner chamber 40 after the first supply of gas 56 is channeled out of the inner chamber 40. Accordingly, when the second supply of gas 60 flows through the bleed hole 52 into the inner chamber 40, the residual heat in the inner chamber 40 will warm/heat the second supply of gas 60. This heating of the second supply of gas 60 causes the gas to expand (in accordance with the equation $PV=nRT$). In turn, this expansion of the second supply of gas 60 increases the ability of the second supply of gas 60 to fill the inflatable curtain 28 and maintain (for extended periods of time) the inflatable curtain 28 at a pressure capable of protecting the occupant.

Moreover, when the second supply of gas 60 flows out of the diffuser 88, this gas flows through the filter 96. As noted above, the filter 96 absorbs some of the heat from the hot gas produced in conjunction with the ignition of the pyrotechnic material 64. In some embodiments, this residual heat in the filter 96 may be imparted to the second supply of gas 60 as it passes through the filter 96. Again, such "heating" of the second supply of gas 60 causes this gas to expand and further increases the ability of the second supply of gas 60 to maintain the inflatable curtain 28 at a pressure capable of protecting the occupant for extended periods of time.

In some embodiments, the ability of the second supply of gas 60 to absorb some of the residual heat found in the filter 96 and/or the inner chamber 40 may provide significant advantages. Specifically, because this heat is absorbed (and/or dissipated) by the second supply of gas 60, this heat within the inflator 32 is less likely to "soak out" of the inflator 32 and damage/melt the areas surrounding the inflator 32. Accordingly, the issues related to "heat soak out," which were discussed above, are greatly reduced and/or eliminated.

Referring now to FIG. 6, a cross-sectional view illustrates a further aspect of the present embodiments. Specifically, FIG. 6 shows the inflator 32 after the inner chamber 40 has deployed (as a result of the ignition of the pyrotechnic material 64) such that all or a portion of the first supply of gas 56 has been vented out of the inner chamber 40. Accordingly, the pressure of the first supply of gas 56 in the inner chamber 40 is less than or equal to about 17 megapascals. As explained above, when the first supply of gas 56 is being discharged, all or a portion of the second supply of gas 60 remains in the outer chamber 44. The pressure of the second supply of gas 60 in the outer chamber 44 is greater than or equal to about 50 megapascals. The presence of the second supply of gas 60 exerts pressure upon the inner wall 48.

The embodiment of the inflator 32 is designed such that once the pressure exerted by the outer chamber 44 onto the inner wall 48 exceeds a certain threshold, the inner wall 48 will buckle and the inner chamber 40 will decrease in volume whereas the outer chamber 44 will expand in volume. In the embodiment shown in FIG. 6, these changes in volume occurs by having the inner wall 48 buckle or collapse inward. Of course, the exact amount of pressure needed to buckle the inner wall 48 depends upon a variety of factors including the thickness, strength, and modulus of the material used to construct the inner wall 48, the amount of gas within the inner chamber 40, the size of the bleed hole 52, etc. However, when the pressure differential between the outer chamber 44 and the inner chamber 40 is equal to (or exceeds) about 30 megapascals, the inner chamber 40 will buckle and deform inward.

This type of inward buckling of the inner wall 48 may, in some embodiments, be beneficial. As shown in FIG. 6, inward buckling of the inner wall 48 increases the volume of the outer chamber 44. In fact, in some embodiments, the inward buckling of the inner wall 48 will cause the volume of the outer chamber 44 to double or nearly double. Of course, when the volume of the outer chamber 44 increases, the pressure of the second supply of gas 60 within the outer chamber 44 will significantly decrease. Such a reduction in the pressure of the second supply of gas 60 allows the second supply of gas 60 to bleed out of the outer chamber 44 (via the bleed hole 52) at a more controlled or steady rate and over a longer time period. In fact, in some embodiments, the second supply of gas 60 will bleed out at a controlled rate that may be tailored according to the specific embodiment. Accordingly, the bleed down capability and ability of the second supply of gas 60 to bleed out into the curtain 28 and maintain the curtain 28 at a desired pressure is greatly increased. In fact, by allowing the inner wall 48 to buckle, the second supply of gas 60 can bleed out over a period of seconds and maintain the curtain 28 at the desired pressure for 3 to 7 seconds.

Figure 7:
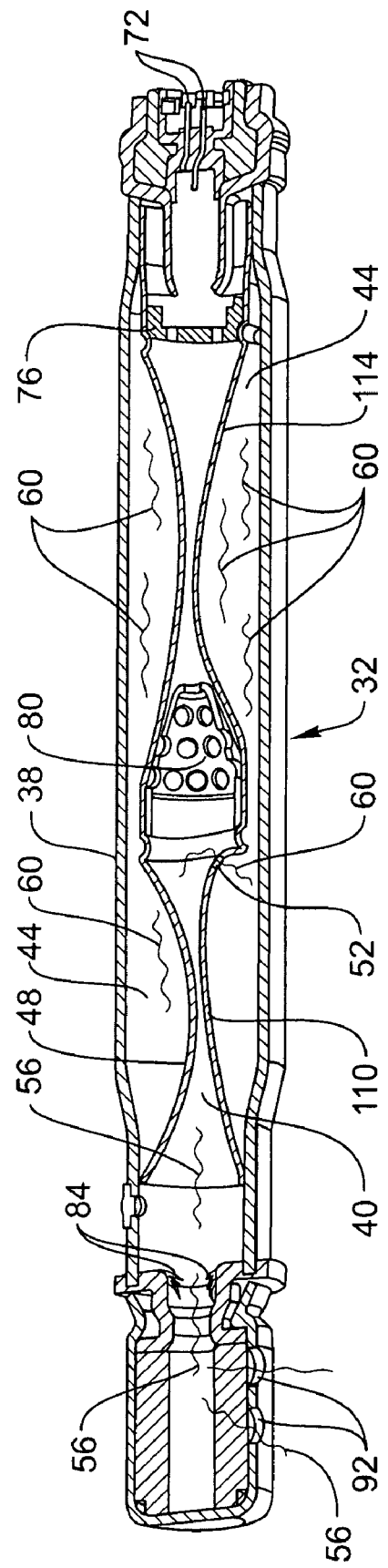
FIG. 7 is a cross-sectional view of a further embodiment of the inflator of FIG. 6 showing an additional portion of the inner chamber buckling as part of the deployment process.

The embodiment shown in FIG. 6 is actually designed such that the inner wall 48 will buckle inward twice during the deployment process. Specifically, the inner wall 48 will begin to experience pressure from the outer chamber 44 within about 7 milliseconds after receiving signal of the crash. Within about 20-25 milliseconds (and more preferably within about 12 milliseconds), the pressure differential between the outer chamber 44 and the inner chamber 40 is about 30 to 35 megapascals, and thus, a first portion 110 of the inner wall 48 buckles inward. After this inward buckling, the first supply of gas 56 and the second supply of gas 60 continue to be vented out of the inflator 32; however the first supply of gas 56 exits the inflator at a faster rate than the second supply of gas 60 (due to the controlling oficid area for the first supply of gas 56 (opening at burst disk 84) is much larger than the controlling orifice area for the second supply of gas 60 (bleed hole 52)). Accordingly, after about 21 milliseconds, the pressure differential between the chambers 40, 44 has again increased to about 30 to 35 megapascals and a second portion 114 of the inner chamber 40 also buckles inwardly. This buckling of the second portion 114 of the inner chamber 40 is illustrated in FIG. 7.

It should be noted that, in order to ensure that the inner chamber 40 buckles during deployment, the internal wall 48 that defines the inner chamber 40 may have a reduced thickness and/or be made of a less rigid material. Such modifications of the wall 48 reduce the strength of the wall 48 and will ensure that the inner chamber 40 will properly deform. Score marks, weakened areas and other ways of ensuring and/or controlling the buckling/deformation of the inner chamber 40 are also possible.

Referring now to FIG. 1-7 generally, it is noted that embodiments of the inflator 32 may also be constructed in which the wall 48 does not buckle during deployment. In these embodiments, the inflator 32 may still be able to maintain the airbag 28 at a desired protection pressure and/or cause the second supply of gas 60 to bleed out of the inflator 32 at a controlled rate. In these embodiments, a much smaller bleed hole 52 may be employed. The exact size of the bleed hole 52 will depend on many factors, including the gas properties (such as volume and pressure), the time desired for the gas 60 to bleed out of the inflator 32, etc.

Referring still to FIGS. 1-7 generally, the present embodiments also provide for a method for maintaining an inflatable curtain 28 at a protection pressure. Generally, this method will involve obtaining the inflator 32 and then deploying the first supply of gas 56 from the inner chamber 40 by igniting the pyrotechnic material 64 to fully inflate the inflatable curtain 28. Once this step has been completed, the second supply of gas 60 bleeds out of the outer chamber 44 through the inner chamber 40 and into the inflatable curtain 28 to maintain the pressure of the inflatable curtain at a protection pressure.

It should also be noted that making the inner chamber 40 and the outer chamber 40 concentric provides additional benefits/cost savings to the manufacturer. Specifically, as noted above, during storage of the undeployed inflator 32, there is no pressure differential between the inner chamber 40 and the outer chamber 44. Accordingly, less expensive, welded tubing may be used to create these chambers (rather than seamless, non-welded tubing which is required under certain regulations for all tubing that experiences a pressure differential during storage). Likewise, as the ignition of the pyrotechnic material 64 only occurs within the inner chamber 40, the peripheral wall 38 must only be designed for the storage pressure (rather than the deployment pressure) since the peripheral wall 38 will experience only a small fraction of the pressure increase due to the combustion of the pyrotechnic material 64. Accordingly, thinner tubing may be used for the peripheral wall 38. Further, with respect to the internal wall 48, this wall must be designed to withstand the increase in pressure of the first supply of gas from the storage pressure to the combustion pressure; this wall 48 does not have to withstand any changes in pressure associated with the second supply of gas 60 because this second supply of gas 60 is maintained at the storage pressure throughout combustion. (Of course, the inner wall 48 must also be designed to withstand the external pressures associated with bleed down of the second supply of gas 60, unless the embodiment utilizing bucking of the inner wall 48 is desired.)

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An inflator for deploying and inflating an airbag comprising:
    an inner chamber having a first supply of gas and a pyrotechnic material, wherein the first supply of gas is sufficient to inflate and deploy an airbag after ignition of the pyrotechnic material;
    an outer chamber having a second supply of gas; and
    a bleed hole between the inner chamber and the outer chamber, wherein the second supply of gas bleeds out of the outer chamber through the inner chamber, wherein during deployment of the airbag, the inner chamber decreases in volume and the outer chamber expands in volume.

2. An inflator as in claim 1 wherein ignition of the pyrotechnic material in the inner chamber provides heat to the inner chamber which is imparted to and heats the second supply of gas as the second supply of gas flows through the inner chamber.

3. An inflator as in claim 1, further comprising a diffuser having a filter through which the first supply of gas and second supply of gas flow, wherein the filter cools the first supply of gas prior to the gas inflating the airbag.

4. An inflator as in claim 3, wherein heat from the ignition of the first supply of gas is transferred to the filter, and wherein the filter transfers heat to the second supply of gas as the second supply of gas flows through the filter.

5. An inflator as in claim 1 wherein the second supply of gas is sufficient to maintain the inflated airbag at a protection pressure for at least five seconds after initial inflation.

6. An inflator as in claim 1 wherein the change in volume of both the inner chamber and the outer chamber during deployment occurs by having an inner wall buckle under the pressure of the second supply of gas in the outer chamber.

7. An inflator as in claim 1 wherein the change in volume of both the inner chamber and the outer chamber during deployment causes the second supply of gas to bleed out of the inflator at a controlled rate.

8. An inflator as in claim 1 wherein at least a portion of the inner chamber is concentric with the outer chamber.

9. An inflator for deploying an airbag curtain comprising:
    an inner chamber having a first supply of gas and a pyrotechnic material, wherein the first supply of gas is sufficient to deploy and inflate an airbag after ignition of the pyrotechnic material;
    an outer chamber having a second supply of gas, wherein at least a portion of the inner chamber is concentric with the outer chamber; and
    a bleed hole between the inner chamber and the outer chamber, wherein the second supply of gas bleeds out of the outer chamber through the inner chamber by passing through the bleed hole, wherein during deployment of the airbag, an inner wall of the inflator buckles under the pressure of the second supply of gas in the outer chamber.

10. An inflator as in claim 9 wherein ignition of the pyrotechnic material in the inner chamber provides heat to the inner chamber which is imparted to and heats the second supply of gas as the second supply of gas flows through the inner chamber, further comprising a filter through which the first supply of gas and second supply of gas flow, wherein heat from the ignition of the first supply of gas is transferred to the filter, and wherein the filter transfers heat to the second supply of gas as the second supply of gas flows through the filter.

11. An inflator for deploying an airbag curtain comprising:
    an inner chamber having a first supply of gas and a pyrotechnic material, wherein the first supply of gas is sufficient to deploy and inflate an airbag after ignition of the pyrotechnic material;
    an outer chamber having a second supply of gas;
    a bleed hole between the inner chamber and the outer chamber, wherein the second supply of gas bleeds out of the outer chamber through the inner chamber by passing through the bleed hole, wherein ignition of the pyrotechnic material in the inner chamber provides heat to the inner chamber which is imparted to and heats the second supply of gas as the second supply of gas flows through the inner chamber; and
    a filter through which the first supply of gas and second supply of gas flow, wherein the filter cools the first supply of gas prior to the gas inflating the airbag, wherein heat from the ignition of the first supply of gas is transferred to the filter, and wherein the filter transfers heat to the second supply of gas as the second supply of gas flows through the filter, wherein during deployment of the airbag, an inner wall of the inflator buckles under the pressure of the second supply of gas in the outer chamber.

12. An assembly as in claim 11 wherein the buckling of the inner wall change during deployment causes the second supply of gas to bleed out of the inflator at a constant rate.

13. A method for maintaining an inflatable curtain at a protection pressure comprising:
    obtaining an inflator comprising:
        an inner chamber having a first supply of gas and a pyrotechnic material, an outer chamber having a second supply of gas, and a bleed hole connecting the inner chamber with the outer chamber;
    deploying the first supply of gas by igniting the pyrotechnic material, the first supply of gas fully inflating the inflatable curtain, wherein during deployment of the inflatable curtain, the inner chamber decreases in volume and the outer chamber expands in volume;
    bleeding the second supply of gas out of the outer chamber through the inner chamber and into the inflatable curtain to maintain the pressure of the inflatable curtain at a protection pressure.

14. A method as in claim 13 wherein the second supply of gas is sufficient to maintain the inflated inflatable curtain at a protection pressure for at least five seconds after initial inflation.

15. An inflator as in claim 13 wherein an inner wall buckles from the pressure of the second supply of gas in the outer chamber after the first supply of gas has been deployed.

* * * * *